United States Patent
Reddy et al.

(10) Patent No.: US 9,702,238 B2
(45) Date of Patent: Jul. 11, 2017

(54) WELLBORE SERVICING METHODS AND COMPOSITIONS COMPRISING DEGRADABLE POLYMERS

(71) Applicant: Halliburton Energy Services, Inc., Houston, TX (US)

(72) Inventors: B. Raghava Reddy, The Woodlands, TX (US); Brad Todd, Duncan, OK (US); Janette Cortez, Kingwood, TX (US); Rajesh Kumar Saini, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 376 days.

(21) Appl. No.: 13/660,740

(22) Filed: Oct. 25, 2012

(65) Prior Publication Data

US 2014/0116703 A1     May 1, 2014

(51) Int. Cl.

| | |
|---|---|
| *E21B 43/00* | (2006.01) |
| *E21B 43/25* | (2006.01) |
| *C09K 8/035* | (2006.01) |
| *C09K 8/68* | (2006.01) |
| *C09K 8/74* | (2006.01) |

(52) U.S. Cl.
CPC ............ *E21B 43/25* (2013.01); *C09K 8/035* (2013.01); *C09K 8/68* (2013.01); *C09K 8/74* (2013.01)

(58) Field of Classification Search
CPC ............ E21B 43/00; C09K 8/68; C09K 8/805
USPC ................ 166/300, 305.1, 307, 308.1, 308.2
See application file for complete search history.

(56) References Cited

U.S. PATENT DOCUMENTS

| | | | |
|---|---|---|---|
| 2,703,316 A | | 3/1955 | Schneider |
| 3,912,692 A | | 10/1975 | Casey et al. |
| 4,387,769 A | | 6/1983 | Erbstoesser et al. |
| 4,486,340 A | * | 12/1984 | Glass, Jr. ............... 507/216 |
| 4,585,064 A | | 4/1986 | Graham et al. |
| 4,670,501 A | | 6/1987 | Dymond et al. |

(Continued)

FOREIGN PATENT DOCUMENTS

| | | |
|---|---|---|
| EP | 0903461 A1 | 3/1999 |
| WO | 2008038033 A1 | 4/2008 |
| WO | 2012/104582 A1 | 8/2012 |

OTHER PUBLICATIONS

Albertsson, Ann-Christine, et al., "Aliphatic Polyesters: Synthesis, Properties and Applications," Advances in Polymer Science, 2002, pp. 1-65, 67-161, and 2 Preface pages, vol. 157, Springer-Verlag Berlin Heidelberg.

Filing receipt and specification for patent application entitled "Methods of Using Nanoparticle Suspension Aids in Subterranean Operations," by Philip D. Nguyen, et al., filed Jun. 21, 2012 as U.S. Appl. No. 13/529,413.

(Continued)

*Primary Examiner* — Silvana Runyan
(74) *Attorney, Agent, or Firm* — Craig W. Roddy; Baker Botts L.L.P.

(57) ABSTRACT

Methods and compositions for use in a wellbore penetrating a subterranean formation are provided. In one embodiment, the method of servicing a wellbore may comprise preparing a wellbore servicing fluid comprising a degradation accelerator wherein the degradation accelerator comprises an alkanolamine, an oligomer of aziridine, a polymer of aziridine, a diamine, or combinations thereof; and placing the wellbore servicing fluid comprising a degradation accelerator into the wellbore, the subterranean formation or both wherein the degradation accelerator contacts the degradable polymer.

21 Claims, 1 Drawing Sheet

(56) References Cited

U.S. PATENT DOCUMENTS

| | | | |
|---|---|---|---|
| 5,006,566 A | 4/1991 | Weber et al. | |
| 5,216,050 A | 6/1993 | Sinclair | |
| 5,249,627 A | 10/1993 | Harms et al. | |
| 5,373,901 A | 12/1994 | Norman et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,960,880 A | 10/1999 | Nguyen et al. | |
| 5,977,031 A | 11/1999 | Patel | |
| 6,209,646 B1 | 4/2001 | Reddy et al. | |
| 6,257,335 B1 | 7/2001 | Nguyen et al. | |
| 6,287,639 B1 | 9/2001 | Schmidt et al. | |
| 6,311,773 B1 | 11/2001 | Todd et al. | |
| 6,323,307 B1 | 11/2001 | Bigg et al. | |
| 6,387,968 B1 | 5/2002 | Glück et al. | |
| 6,439,309 B1 | 8/2002 | Matherly et al. | |
| 6,527,051 B1 | 3/2003 | Reddy et al. | |
| 6,554,071 B1 | 4/2003 | Reddy et al. | |
| 6,582,819 B2 | 6/2003 | McDaniel et al. | |
| 6,677,426 B2 | 1/2004 | Noro et al. | |
| 6,782,735 B2 | 8/2004 | Walters et al. | |
| 6,828,279 B2 | 12/2004 | Patel et al. | |
| 6,877,563 B2 | 4/2005 | Todd et al. | |
| 7,021,383 B2 | 4/2006 | Todd et al. | |
| 7,036,587 B2 | 5/2006 | Munoz, Jr. et al. | |
| 7,044,220 B2 | 5/2006 | Nguyen et al. | |
| 7,131,491 B2 | 11/2006 | Blauch et al. | |
| 7,153,575 B2 | 12/2006 | Anderson et al. | |
| 7,166,560 B2 | 1/2007 | Still et al. | |
| 7,281,581 B2 | 10/2007 | Nguyen et al. | |
| 7,334,636 B2 | 2/2008 | Nguyen | |
| 7,350,579 B2 | 4/2008 | Gatlin et al. | |
| 7,380,600 B2 | 6/2008 | Willberg et al. | |
| 7,392,847 B2 | 7/2008 | Gatlin et al. | |
| 7,431,088 B2 | 10/2008 | Moorehead et al. | |
| 7,455,112 B2 | 11/2008 | Moorehead et al. | |
| 7,475,728 B2 | 1/2009 | Pauls et al. | |
| 7,534,745 B2 | 5/2009 | Taylor et al. | |
| 7,541,318 B2 | 6/2009 | Weaver et al. | |
| 7,565,929 B2 * | 7/2009 | Bustos | C09K 8/68 166/279 |
| 7,581,590 B2 | 9/2009 | Lesko et al. | |
| 7,645,723 B2 | 1/2010 | Kirsner et al. | |
| 7,673,686 B2 | 3/2010 | Nguyen et al. | |
| 7,691,789 B2 | 4/2010 | Fu et al. | |
| 7,696,131 B2 | 4/2010 | Oyler et al. | |
| 7,775,278 B2 | 8/2010 | Willberg et al. | |
| 7,779,915 B2 | 8/2010 | Hutchins et al. | |
| 7,784,541 B2 | 8/2010 | Hartman et al. | |
| 7,786,051 B2 | 8/2010 | Lange et al. | |
| 7,819,192 B2 | 10/2010 | Weaver et al. | |
| 7,825,074 B2 | 11/2010 | Schmidt et al. | |
| 7,841,411 B2 | 11/2010 | Fuller et al. | |
| 7,858,561 B2 | 12/2010 | Abad et al. | |
| 7,896,068 B2 | 3/2011 | Lee | |
| 7,934,556 B2 | 5/2011 | Clark et al. | |
| 7,947,630 B2 | 5/2011 | Atkins et al. | |
| 7,956,017 B2 | 6/2011 | Gatlin et al. | |
| 8,003,579 B2 | 8/2011 | Akarsu et al. | |
| 8,016,034 B2 | 9/2011 | Glasbergen et al. | |
| 8,066,068 B2 | 11/2011 | Lesko et al. | |
| 8,076,271 B2 | 12/2011 | Blauch et al. | |
| 8,109,335 B2 | 2/2012 | Luo et al. | |
| 8,136,595 B2 | 3/2012 | Weaver et al. | |
| 8,163,826 B2 | 4/2012 | Willberg et al. | |
| 8,167,043 B2 | 5/2012 | Willberg et al. | |
| 8,230,925 B2 | 7/2012 | Willberg et al. | |
| 8,261,833 B2 | 9/2012 | Nguyen et al. | |
| 8,443,885 B2 | 5/2013 | Rickman et al. | |
| 2004/0074643 A1* | 4/2004 | Munoz et al. | 166/279 |
| 2004/0152601 A1 | 8/2004 | Still et al. | |
| 2004/0261996 A1* | 12/2004 | Munoz et al. | 166/279 |
| 2006/0169448 A1 | 8/2006 | Savery et al. | |
| 2006/0169450 A1 | 8/2006 | Mang et al. | |
| 2007/0173416 A1 | 7/2007 | Moorehead et al. | |
| 2007/0238622 A1* | 10/2007 | Fu et al. | 507/203 |
| 2008/0006405 A1 | 1/2008 | Rickman et al. | |
| 2008/0119374 A1 | 5/2008 | Willberg et al. | |
| 2008/0135242 A1 | 6/2008 | Lesko et al. | |
| 2008/0139417 A1 | 6/2008 | Alsyed et al. | |
| 2008/0210423 A1* | 9/2008 | Boney | 166/281 |
| 2009/0082228 A1* | 3/2009 | Parris et al. | 507/211 |
| 2009/0105097 A1 | 4/2009 | Abad et al. | |
| 2009/0131280 A1* | 5/2009 | Federici et al. | 507/117 |
| 2009/0246501 A1 | 10/2009 | Shuler et al. | |
| 2010/0044041 A1 | 2/2010 | Smith et al. | |
| 2010/0160187 A1 | 6/2010 | Nguyen et al. | |
| 2010/0273685 A1 | 10/2010 | Saini et al. | |
| 2010/0323932 A1 | 12/2010 | Bustos et al. | |
| 2011/0030958 A1 | 2/2011 | Fedorov et al. | |
| 2011/0039737 A1 | 2/2011 | Schmidt et al. | |
| 2011/0120712 A1 | 5/2011 | Todd et al. | |
| 2011/0226479 A1 | 9/2011 | Tippel et al. | |
| 2011/0227254 A1 | 9/2011 | Reck-Glenn et al. | |
| 2011/0284222 A1 | 11/2011 | Chaabouni et al. | |
| 2012/0024526 A1 | 2/2012 | Liang et al. | |
| 2012/0225967 A1 | 9/2012 | Amano et al. | |

OTHER PUBLICATIONS

Filing receipt and specification for patent application entitled "Expanded Wellbore Servicing Materials and Methods of Making and Using Same," by Tingji Tang, filed Oct. 26, 2012 as U.S. Appl. No. 13/661,940.

Filing receipt and specification for patent application entitled "Wellbore Servicing Fluids Comprising Foamed Materials and Methods of Making and Using Same," by Tingji Tang, et al., filed Oct. 26, 2012 as U.S. Appl. No. 13/662,000.

Filing receipt and specification for patent application entitled "Wellbore Servicing Materials and Methods of Making and Using Same," by Tingji Tang, filed Oct. 26, 2012 as U.S. Appl. No. 13/662,055.

Filing receipt and specification for patent application entitled "Expanded Wellbore Servicing Materials and Methods of Making and Using Same," by Tingji Tang, filed Oct. 26, 2012 as U.S. Appl. No. 13/662,105.

Halliburton brochure entitled "SandTrap® ABC Formation Consolidation Service," Sand Control Fluids and Pumping, Jun. 2011, 2 pages, Halliburton.

Office Action dated Jul. 17, 2013 (20 pages), U.S. Appl. No. 13/662,055, filed Oct. 26, 2012.

Filing receipt and specification for patent application entitled "Wellbore Servicing Methods and Compositions Comprising Degradable Polymers," by B. Raghava Reddy, et al., filed Oct. 29, 2013 as U.S. Appl. No. 14/065,701.

Foreign communication from a related counterpart application—International Search Report and Written Opinion, PCT/US2013/061434, Jan. 9, 2014, 12 pages.

Foreign communication from a related counterpart application—International Search Report and Written Opinion, PCT/US2013/061437, Jan. 20, 2014, 10 pages.

Foreign communication from a related counterpart application—International Search Report and Written Opinion, PCT/US2013/061429, Dec. 20, 2013, 12 pages.

Foreign communication from a related counterpart application—International Search Report and Written Opinion, PCT/US2013/061425, Jan. 8, 2014, 11 pages.

International Search Report and Written Opinion issued in related International Application No. PCT/US2014/052546, mailed Feb. 17, 2015, 10 pages.

International Preliminary Report on Patentability issued in related PCT Application No. PCT/US2013/061429 mailed May 7, 2015, 10 pages.

Office Action issued in related Canadian Application No. 2,908,429, mailed Oct. 18, 2016 (5 pages).

\* cited by examiner

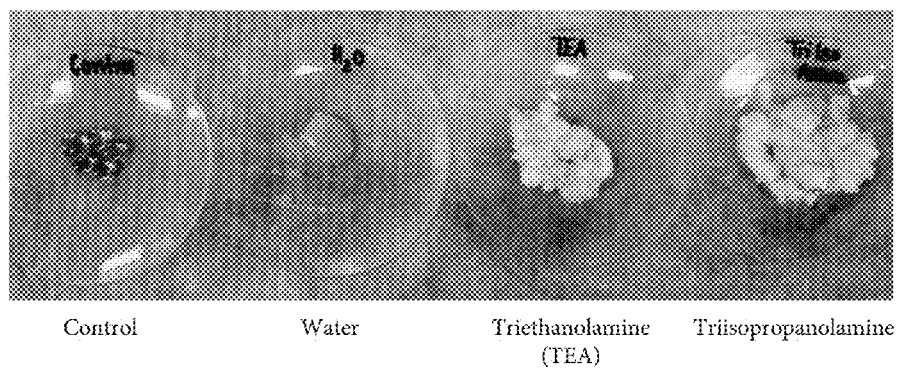
Control　　　Water　　　Triethanolamine　　Triisopropanolamine
　　　　　　　　　　　　　　(TEA)

WELLBORE SERVICING METHODS AND COMPOSITIONS COMPRISING DEGRADABLE POLYMERS

STATEMENT REGARDING FEDERALLY SPONSORED RESEARCH OR DEVELOPMENT

Not applicable.

BACKGROUND

Field

This disclosure relates to methods and compositions for servicing a wellbore. More specifically, it relates to methods and compositions for use in a wellbore penetrating a subterranean formations.

Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Degradable polymers are increasingly becoming of interest in various subterranean applications based, at least in part, on their ability to degrade and leave voids, act as a temporary restriction to the flow of a fluid, or produce desirable degradation products (e.g., acids). One particular degradable polymer that has received recent attention is poly(lactic acid) because it is a material that will degrade downhole in aqueous media after it has performed a desired function or because its degradation products will perform a desired function (e.g., degrade an acid soluble component, or lower fluid pH to breakdown borate crosslinked fluids).

Degradable polymers may be used to leave voids behind upon degradation to improve or restore the permeability of a given structure. For instance, a proppant pack may be created that comprises proppant particulates and degradable polymers so that, when the degradable polymer degrades, voids are formed in the proppant pack. Similarly, voids also may be created in a set cement in a subterranean environment. Moreover, degradable polymers may be used as a coating to temporarily protect a coated object or chemical from exposure to the subterranean environment. For example, a breaker or some other treatment chemical may be coated, encapsulated, or encaged in poly(lactic acid) and used in a subterranean operation such that the breaker may not be substantially exposed to the subterranean environment until the poly(lactic acid) coating substantially degrades. Still another use for degradable polymers in subterranean operations involves creating downhole tools or parts of downhole tools out of solid masses of a degradable polymer. In such operations, the degradable polymer may be designed such that it does not substantially degrade until the tool has completed its desired function. In some operations, a tool function may be temporarily delayed by coating with polylactic acid. Still other uses for degradable polymers in subterranean operations include their use as diverting agents, bridging agents, and fluid loss control agents.

Generally, degradation of a water-degradable polymer with suitable chemical composition and physical properties, for example PLA, may be most desirably achieved over a time period ranging from about few days to about few weeks at bottom hole temperatures (BHT) of above about 60° C. (140° F.). Unfortunately, many well bores have a BHT that may be lower than 60° C. In these lower temperature environments, a relatively longer time (e.g., weeks or even months) may be necessary for the degradable polymer to hydrolyze and breakdown, which may be undesirable. In other situations, degradable polymers which will be stable for desired durations at high temperatures under downhole conditions may be needed. Such materials will be required to be more resistant to hydrolytic degradation (i.e., polymer chain scission due to reactions with water). In such cases, methods to accelerate the reactions with water to break the polymer down at the end of an operation in a controlled and predictable manner will be of use. In general, irrespective of BHT, it is desirable to be able to control and/or design a fluid composition with prespecified rates and durations for degradation and removal of the degradable polymer-based materials employed to accomplish timed events or functions in order to minimize waiting-on-degradation time. It is understood that in order to flowback out or remove the degradable material from the location of its placement, it may not be necessary to break it totally down to the monomer level. For effective removal of the material at the end of an intended operation, the percentage of polymer degradation needed may be as low as 20%. The polymer plug or filter cake should degrade to an extent sufficient to loosen its packed particle density so that a flowing fluid can break up and flow out the remaining undegraded particulate material.

The quantities of the degradable polymer required to accomplish a desired objective depend on the type of application. For example, in a diversion operation during multistage fracturing, the amounts of degradable polymer needed may be as high as 250 to 500 lbs/1000 gal. It would be beneficial to reduce the amount of polymer utilized to accomplish a particular operation without sacrificing the intended performance objectives. This would reduce the cost of the operation as well as reduce the amount of breakers needed. Accordingly, an ongoing needs exists for wellbore servicing fluids comprising degradable polymers and methods of making and using same.

SUMMARY

Disclosed herein is a method of servicing a wellbore comprising providing a degradable polymer within a portion of a wellbore, a subterranean formation or both; preparing a wellbore servicing fluid comprising a degradation accelerator wherein the degradation accelerator comprises an alkanolamine, an oligomer of aziridine, a polymer of aziridine, a diamine, or combinations thereof; and placing the wellbore servicing fluid comprising a degradation accelerator into the wellbore, the subterranean formation or both wherein the degradation accelerator contacts the degradable polymer.

Also disclosed herein is a method of servicing a wellbore penetrating a subterranean formation comprising placing a fracturing fluid comprising a degradable polymer into the subterranean formation via the wellbore wherein the degradable polymer comprises a aliphatic polyester, a poly(lactide), a poly(glycolide), a poly($\epsilon$-caprolactone), a poly(hydroxy ester ether), a poly(hydroxybutyrate), a poly(anhydride), a polycarbonate, a poly(ortho ether), a poly (amino acid), a poly(ethylene oxide), a poly(phosphazene), a polyether ester, a polyester amide, a polyamide, a copolymer of the foregoing, or any combinations thereof; and contacting the degradable polymer with the degradation accelerator, wherein the degradation accelerator comprises an alkanolamine, an oligomer of aziridine, a polymer of aziridine, a diamine, or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a picture of polymer swelling in the presence of water and materials of the present disclosure at 140° F. over a 2-day period.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

The methods of the present disclosure generally comprise providing a degradable aliphatic polymer, comprising carboxy functional groups in the polymer backbone derived from hydroxyalkanoic acid monomers, within a portion of a wellbore and/or subterranean formation, introducing a degradation accelerator (DA) to the portion of the wellbore and/or subterranean formation, and allowing the DA to degrade or accelerate the degradation of the degradable polymer. The DA may be in the form of a pumpable fluid (e.g., present in an aqueous carrier fluid, a liquid additive, component of a wellbore servicing fluid, etc. . . . ) In some embodiments, the DA is a component of a solution. As used herein, the term "solution" does not connote any particular degree of dissolution or order of mixing of the substances present in the solution. In some embodiments, the DA material may increase the volume of the degradable polymer by in situ swelling prior to degradation. In some embodiments, the portion of the wellbore and/or subterranean formation where the degradable polymer is located may have a temperature of about 140° F. (60° C.) or less. In some embodiments, the portion of the wellbore and/or subterranean formation where the degradable polymer is located may have a temperature of higher than about 140° F. (60° C.). In some exemplary embodiments, at least 20% of the degradation of the degradable polymer may take place within a time frame of less than about three days after the introduction of the DA solution.

In an embodiment, the DA comprises an alkanolamine, an oligomer of aziridines (e.g., ethyleneimine), a polymer of aziridine, a diamine, derivatives or combinations thereof. The term "derivative" is defined herein to include any compound that is made from one or more of the DAs, for example, by replacing one atom in the DA with another atom or group of atoms, rearranging two or more atoms in the DA, ionizing one of the DAs, or creating a salt of one of the DAs. When describing derivatives herein those materials are contemplated as being "derived by," "derived from," "formed by," or "formed from," other materials described herein and such terms are used in an informal sense and are not intended to reflect any specific synthetic methods or procedure, unless specified otherwise.

In an embodiment, the DA comprises an alkanolamine. Alkanolamines are chemical compounds that contain a hydroxyl group (i.e., —OH) and an amine group, which may be a primary amine group, a secondary amine group or a tertiary amine group. An alkanolamine suitable for use in the present disclosure is a compound characterized by general Formula I:

Formula I where $R_1$ and $R_2$ may each independently be hydrogen, an unsubstituted alkyl chain comprising from about 1 to about 6 carbon atoms, or a substituted alkyl chain comprising from about 3 to about 6 carbon atoms. In an embodiment, X comprises a substituted or unsubstituted alkylene chain having from about 1 to about 4 carbon atoms. The term "alkyl group" is used herein in accordance with the definition specified by IUPAC: a univalent group formed by removing a hydrogen atom from an alkane. The term "alkylene" is used herein in accordance with the definition specified by IUPAC: the divalent groups formed from alkanes by removal of two hydrogen atoms form the same carbon atom. The term "substituted" when used to describe a group is intended to describe any non-hydrogen moiety that formally replaces a hydrogen in that group and is intended to be non-limiting.

In an embodiment, $R_1$ and $R_2$ may both be hydrogen, creating a primary amine; either $R_1$ or $R_2$ may be a hydrogen, creating a secondary amine; or $R_1$ and $R_2$ may be substituent groups other than hydrogen, creating a tertiary amine.

Nonlimiting examples of alkanolamines suitable for use in the present disclosure include monoethanolamine, triethanolamine, diethanolamine, triisopropanolamine, diglycolamine, di-2-propanolamine, N-methyldiethanolamine, 2-amino-2-methyl-1-propanol, 2-piperidineethanol, aminopropanediol and the like.

In an embodiment, the DA comprises an alkanolamine in the form of an aqueous solution with a concentration of from about 10 weight percent (wt. %) to about 99 wt. %, alternatively from about 40 wt. % to about 85 wt. %, or alternatively from about 50 wt. % to about 80 wt. % based on the total weight of the solution. In an embodiment, the alkanolamine solution may have a pH of less than about 11, alternatively less than about 10, or alternatively less than about 9.

In an embodiment, the DA comprises oligomers of aziridine or of aziridine derivatives (e.g., ethyleneimine). Herein the disclosure may refer to an oligomer of aziridine and/or an oligomer of an aziridine derivative. It is to be understood that the terms aziridine oligomer and aziridine derivative oligomer herein are used interchangeably. The aziridine oligomers may comprise amines containing at least one secondary and/or at least one tertiary nitrogen, i.e., at least one secondary (—NH—) and/or at least one tertiary (—N<) amine group. Additionally, the aziridine oligomers may also contain primary nitrogens, i.e., primary amine groups (—NH$_2$). In an embodiment, the number of monomers in the aziridine oligomer is less than about 100, alternatively less than about 10, or alternatively less than about 5.

In an embodiment, the aziridine oligomer comprises a linear aziridine oligomer characterized by general Formula II:

Formula II where the value of n ranges from about 2 to about 100, alternatively from about 2 to about 10, alternatively from about 2 to about 5, or alternatively from about 2 to about 4. In an embodiment, R$_3$ comprises a primary amine group (—NH$_2$). Alternatively, R$_3$ comprises the aziridine ring connected to the repeating oligomer unit through the aziridine ring nitrogen. In an embodiment, the aziridine oligomer comprises diethylenetriamine (i.e., n=2). In an embodiment, the aziridine oligomer comprises triethylenetetramine (i.e., n=3). In another embodiment, the aziridine oligomer comprises tetraethylenepentamine (i.e., n=4).

In an embodiment, the aziridine oligomer comprises an aziridine oligomer characterized by general Formula III:

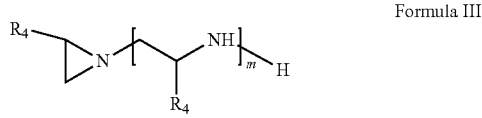

Formula III where the value of m ranges from about 2 to about 100, alternatively from about 2 to about 10, alternatively from about 2 to about 5, or alternatively from about 2 to about 4. While the structure depicted by Formula III only shows one of the hydrogens from the methylene groups of the aziridine ring being substituted with a R$_4$ group, both of the aziridine methylene groups may be substituted. In an embodiment, R$_4$ and any of the other aziridine methylene group substituents comprise methyl groups.

In an embodiment, the aziridine oligomer comprises a branched aziridine oligomer. In an embodiment, the branched aziridine oligomer comprises a branched oligoethyleneimine characterized by general Formula IV:

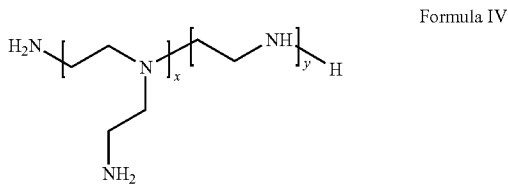

Formula IV where the repeating units may occur in a total amount of about (x+y) with the total value of (x+y) ranging from about 2 to about 50, alternatively from about 2 to about 30, alternatively from about 2 to about 10, or alternatively from about 2 to about 5. In all cases, x or y is greater than or equal to 1.

In an embodiment, the DA comprises an aziridine oligomer in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the aziridine oligomer solution may have a pH of less than about 11, alternatively less than about 10, or alternatively less than about 9.

In an embodiment, the DA comprises an aziridine polymer, wherein the n and m values in Formula II and Formula III respectively or (x+y) value in Formula IV are greater than 100, alternately greater than 1000, or alternately greater than 10000. In an embodiment, the DA comprises an aziridine polymer in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the aziridine polymer solution may have a pH of less than about 11, alternatively less than about 10, or alternatively less than about 9. An example of an aziridine polymer suitable for use in the present disclosure is HZ-20 crosslinker which is commercially available from Halliburton Energy Services.

In an embodiment, the DA comprises a diamine. Diamines are chemical compounds that contain two amine groups. A diamine suitable for use in the present disclosure is a compound characterized by general Formula V:

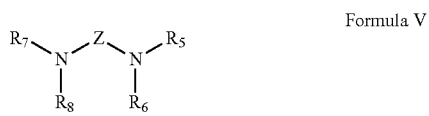

Formula V where R$_5$, R$_6$, R$_7$, and R$_8$ may each independently be hydrogen, an unsubstituted alkyl chain having from about 1 to about 3 carbon atoms, or a substituted alkyl chain having from about 3 to about 4 carbon atoms and Z comprises an unsubstituted alkylene chain having from about 2 to about 6 carbon atoms, or a substituted alkylene chain having from about 2 to about 6 carbon atoms. In an embodiment, Z comprises 2 carbon atoms resulting in an unsubstituted alkylene chain (i.e., ethylene group). In such an embodiment, at least one of R$_5$, R$_6$, R$_7$, or R$_8$ is not a hydrogen. In an embodiment, the diamine DA does not comprise ethylenediamine.

In an embodiment, the DA comprises a diamine in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the diamine solution comprises an aqueous fluid (e.g., water) and may have a pH of less than about 11, alternatively less than about 10, or alternatively less than about 9.

In an embodiment, the DA comprises amine nitrogens and/or groups which are chemically derivatized to contain an operable functionality or substituent. The operable functionality or substituent may be acted upon in any fashion (e.g., chemically, physically, thermally, etc.) and under any conditions compatible with the process in order to release the DA at a desired time and/or under desired conditions such as in situ wellbore conditions (e.g., temperature, pH induced hydrolysis). Upon removal of the operable functionality or substituent, the active form of the DA can be released and made available for polymer degradation. In an embodiment, a DA of the type disclosed herein is utilized in high temperature applications (e.g., at temperatures greater than about 90° C., alternatively greater than about 120° C., or alternatively greater than about 150° C.). Any suitable operable functionality or substituent or methods for preparing DAs containing operable functionalities or substituents may be employed. A nonlimiting example of such methodologies include acylation of primary or secondary nitrogen atoms or the alcohol groups of the DA molecules utilizing any suitable acylating agent such as acid anhydrides, esters, anhydrides and acid chlorides. An example of a chemically derivatized DA comprising amine nitrogens is tetracetyl ethylene diamine, which upon in situ hydrolysis in a well bore or formation can generate a mixture of amines which function as DAs of the type disclosed herein. In an embodiment, a chemically derivatized DA is insoluble in the aqueous fluid.

Degradable aliphatic polymers suitable for use in the methods of the present disclosure are those capable of being degraded by water in an aqueous solution through a mechanism described herein or any other suitable mechanism, and comprise carboxy (—COO—) functional groups in the polymer backbone. Examples of functional groups that comprise —COO— groups include esters (C—COO—C), carbonates (C—O—COO—C), and carbamates (C—N—COO—C). This degradation may be the result of a chemical reaction with water under neutral pH conditions, acid or base-catalyzed conditions or under thermally-activated conditions, or a combination thereof, and the degradation may occur over time as opposed to immediately. In some embodiments, degradation of the degradable polymers may be the result of hydrolytic and/or aminolytic degradation in the presence of DA materials of the type disclosed herein. The terms "degrading," "degradation," and "degradable" refer to both the relatively extreme cases of hydrolytic or aminolytic degradation that the degradable polymer may undergo, i.e., heterogeneous (or bulk erosion) and homogeneous (or surface erosion) down to the monomer level, and any stage of degradation in between. The terms "polymer" or "polymers" as used herein do not imply any particular degree of polymerization; for instance, oligomers are encompassed within this definition provided that such materials are solid particulates, and remain substantially insoluble in an aqueous medium for at least 3 to 8 hours at BHT.

In some instances, the degradable polymer may be capable of releasing a desirable degradation product, e.g., an acid or a base or a neutral molecule, during its degradation. Among other things, the degradable polymers capable of releasing an acid may degrade after a desired time to release an acid, for example, to degrade a filter cake, to lower pH or to reduce the viscosity of a treatment fluid. Alternately, the degradable polymers capable of releasing acidic, neutral or basic materials may degrade after a desired time to release such materials, for example, to chelate metal ions capable of forming soluble materials to prevent scale depositions in the permeable portions of the formation.

In an embodiment, the degradable polymer comprises carboxylic acid-derived (i.e., —COO—) functional groups on the polymer backbone. Examples of suitable degradable polymers that may be used in conjunction with the methods of this disclosure include, but are not limited to, aliphatic polyesters, poly(lactides), poly(glycolides), poly(ϵ-caprolactones), poly(hydroxy ester ethers), poly(hydroxybutyrates), poly(anhydrides), poly(carbonates), poly(ether esters), poly(ester amides), poly(carbamates) and copolymers, blends, derivatives, or combinations of any of these degradable polymers. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "copolymer" as used herein is not limited to copolymerization of a combination of two monomers, but includes any combination of any number of monomers, e.g., graft polymers, terpolymers and the like. For example, suitable copolymers may include an aliphatic polyester that is grafted with polyethylene oxide or polyacrylamide, or block polymers containing one or more blocks containing a carboxy (—COO—) group and another block containing non-carboxy containing polymer segment such as polyamide, poly(alkylene oxide), poly(anhydride) polyacrylamide or poly(AMPS).

Degradable polymers comprising an anhydride bond may be the most reactive of the degradable polymers, e.g., they may have faster degradation rates, even at low temperatures. Suitable DA solutions may enhance the rate of a degradation reaction. In embodiments wherein the temperature of the surrounding subterranean formation is low, (e.g. temperatures in the range of from about 50° F. (10° C.) to about 140° F. (60° C.), the degradable polymer used may be an anhydride, as such degradable polymers are thought to hydrolyze more readily. According to some embodiments in which the degradable polymer comprises a polyanhydride, the degradable polymer may be made to hydrolyze at a higher temperature by increasing the hydrophobicity of the degradable polymer so that water does not reach the hydrolyzable group as readily. In general, the hydrophobicity of a polyanhydride may be increased by increasing the size or carbon number of hydrocarbon groups in these polymers. Degradable polymers that contain an ester bond (e.g. polylactide, polyglycolide, etc.) may degrade more slowly, and when copolymerized with a reactive monomer such as an anhydride, the degradation reactivity may be adjusted to meet some user and/or process need. Simple melt blends of degradable polymers of different degradation rates and/or physical properties (e.g., glass transition temperatures, melting temperature, crystallization temperatures, and crystalline content) provided at least one component of such blends comprises an aliphatic degradable polymer comprising carboxy (—COO—) groups in the polymer backbone are also suitable for use in the present disclosure. In exemplary embodiments, aliphatic polyesters such as poly(lactic acid), poly (anhydrides), and poly(lactide)-co-poly(glycolide) copolymers may be used.

The choice of degradable polymers may depend on the particular application and the conditions involved. For example, degradable polymers may include those degradable materials that release useful or desirable degradation products, e.g., an acid, base or neutral compound(s). Such degradation products may be useful in a downhole application, e.g., to break a viscosified treatment fluid or an acid soluble component present therein (such as in a filter cake), to lower the pH or to act as scale inhibitors. Other guidelines to consider in selecting a degradable polymer include the time required for the requisite degree of degradation and the desired result of the degradation (e.g., voids).

In an embodiment, the degradable polymer is an aliphatic polyester, such as poly(lactic acid) (PLA). Other degradable polymers comprising carboxy groups (—COO—) that are subject to hydrolytic and/or aminolytic degradation may also be suitable for use in the present disclosure. In embodiments in which the degradable polymer is poly(lactic acid), the poly(lactic acid) may have been synthesized from lactic acid by a condensation reaction or, more commonly, by ring-opening polymerization of cyclic lactide monomer. Since both lactic acid and lactide can achieve the same repeating unit, the general term "poly(lactic acid)" as used herein refers to a polymer made from lactides, lactic acid, or oligomers, without reference to the degree of polymerization. The lactide monomer exists generally in three different forms: two stereoisomers L- and D-lactide and racemic D,L-lactide (meso-lactide).

The chirality of the lactide units provides a means to adjust, among other things, degradation rates, as well as physical and mechanical properties. Poly(L-lactide), for instance, is a semicrystalline polymer with a relatively slow hydrolysis rate. This could be desirable in applications of the present disclosure where a slower degradation of the degradable polymers is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present disclosure. Additionally, they may be copolymerized with, for example, glycolide or other monomers like ε-caprolactone, 1,5-dioxepan-2-one, trimethylene carbonate, or other suitable monomers to obtain polymers with different properties or degradation times. The lactic acid stereoisomers can be modified to be used in the present disclosure by, among other things, blending, copolymerizing or otherwise mixing the stereoisomers, by blending, copolymerizing or otherwise mixing high and low molecular weight poly(lactic acid), or by blending, copolymerizing or otherwise mixing a poly(lactic acid) with another polyester or polyesters.

Plasticizers may be included in the degradable polymers used in the methods of the present disclosure. The plasticizers may be present in an amount sufficient to provide characteristics that may be desired, for example, to provide tackiness of the generated degradable polymers or to provide improved melt processability. In addition, the plasticizers may enhance the degradation rate of the degradable polymers. The plasticizers, if used, are at least intimately incorporated within the degradable polymers. An example of a suitable plasticizer for poly(lactic acid) would include oligomeric lactic acid. Examples of plasticizers that may be useful in some embodiments of the present disclosure include, but are not limited to, polyethylene glycol (PEG); polyethylene oxide; oligomeric lactic acid; citrate esters (such as tributyl citrate oligomers, triethyl citrate, acetyltributyl citrate, and acetyltriethyl citrate); glucose monoesters; partially hydrolyzed fatty acid esters; PEG monolaurate; triacetin; poly(s-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate; dipropylene glycol dibenzoate; glycerol; ethyl phthalyl ethyl glycolate; poly(ethylene adipate)distearate; di-iso-butyl adipate; or any combinations thereof. The choice of an appropriate plasticizer will depend on the particular degradable polymer utilized. It should be noted that, in certain embodiments, when initially formed, the degradable polymer may be somewhat pliable. But once substantially all of the solvent has been removed, the particulates may harden. More pliable degradable polymers may be beneficial in certain chosen applications. The addition of a plasticizer can affect the relative degree of pliability. Also, the relative degree of crystallinity and amorphousness of the degradable polymer can affect the relative hardness of the degradable polymers. In turn, the relative hardness of the degradable polymers may affect the ability of the DA solutions to degrade the degradable polymer at low temperatures.

In some embodiments in which a degradable polymer is degraded through a DA catalyzed, or mediated pathway and/or through a pathway that involves a DA as the reactant, the DA solution provides a nucleophile capable of participating in the degradation of a degradable polymer in low temperature subterranean environments, for example, at a BHT of less than about 180° F. (82.2° C.), alternatively less than about 160° F. (71.1° C.), or alternatively less than about 140° F. (60° C.). Alternately the degradable polymer is designed for high temperature applications by suitably modifying the structure of the polymer.

The DA solution may provide a nucleophile to accelerate the degradation rate that would be possible when the polymer is allowed to degrade in the presence of an aqueous fluid not containing the DA solution. Alternately, a derivatized DA can be used to delay the release of active form DA at high temperatures. For example, such high temperatures may be greater than about 180° F. (82.2° C.), alternatively greater than about 250° F. (121.1° C.) or alternatively greater than about 300° F. (148.9° C.)

In some exemplary embodiments, the degradation of the degradable polymer in the presence of the DA solution may take place within a time frame of less than about 1 month, alternatively less than about 2 weeks, alternatively less than about 1 week, or alternatively less than about 3 days.

The amount of DA solution that may be used to degrade a degradable polymer in the present disclosure will depend on several factors including, but not limited to, the pH of the DA solution, the nucleophilicity of nucleophiles present in the solution, the degradable polymer, the temperature of the subterranean formation, the nature of the subterranean formation, and the desired time and/or rate of degradation. In some embodiments, the molar ratio of the DA solution to the degradable polymer is equivalent (calculated based on the molar quantities of —COO— units in the polymer, and the molar quantities of nucleophilic centers in the DA molecules) or slightly greater than (e.g., about 10%) the stoichiometric ratio. In some embodiments, the amount of DA solution is in an amount sufficient to degrade equal to or greater than about 20% of the degradable polymer, alternatively equal to or greater than about 50% of the degradable polymer, or alternatively equal to or greater than about 70% of the degradable polymer wherein polymer degradation is measured by degradable polymer weight loss under wellbore conditions over a specified duration.

In some embodiments, the degradable polymer may swell and absorb water in an aqueous media comprising the DA to a greater extent than the swelling of the degradable polymer observed in the aqueous media without the DA solution. In an embodiment, the DA functions initially to swell the degradable polymer and later to degrade the degradable polymer. In another embodiment, both swelling and degradation of the degradable polymer in the presence of the DA solution take place simultaneously. In yet another embodiment, the DA may swell but not degrade the degradable polymer, and vice versa.

In an embodiment, the degradable polymer swells at least about 2 times its volume, alternately at least about 5 times, or alternately at least about 10 times in the presence of the DA solution. In an embodiment, the degradable polymer increases in weight, in the presence of DA solution, by at least about 2 times its mass, alternately at least about 3 times or alternately at least about 10 times its mass prior to the reduction in weight as a result of degradation of the degradable polymer.

According to certain embodiments of the present disclosure, while not wanting to be limited by any particular theory, it is believed that the DA solutions disclosed herein may degrade a degradable polymer by way of, inter alia, a nucleophilic substitution reaction at the carbonyl carbon of the —COO— group. Nucleophilic substitution reactions at the carbonyl carbon of a carboxy group are generally thought to follow a nucleophilic addition-elimination mechanism. In general, a nucleophilic substitution reaction occurs when a nucleophile becomes attracted to a full or partial positive charge on an electrophile. During the reaction, the nucleophile forms a chemical bond to the electrophile by donating both bonding electrons and displacing another functional group that was previously bonded to the electrophile. Generally, all molecules or ions with a free pair of electrons can act as nucleophiles, however, negative ions (anions) may be more potent than neutral molecules. A neutral nitrogen atom in a molecule (for example, an amine) is more nucleophilic than a neutral oxygen atom in a neutral molecule (for example, in water, alcohol or ether). The nucleophiles of the present disclosure may be neutral or negatively charged Lewis bases. In general, the more basic the ion (the higher the $pK_a$ of the conjugate acid), the more reactive the ion may be as a nucleophile. In the degradable polymers of the current disclosure, the electrophile is the carbon of a carbonyl group of the —COO— functional group in the polymer backbone.

According to certain embodiments of the present disclosure, while not wanting to be limited by any particular theory, it is believed that the DA solutions may degrade the degradable polymer through a hydrolytic or aminolytic pathway. The lone electron pair of any of the amine groups or any of the lone electron pairs of any hydroxyl or otherwise oxygen-containing groups in the DA may act as a nucleophile.

By way of explanation and not of limitation, it is believed that according to some embodiments the hydrolysis of a degradable polymer may be expressed by the following exemplary pathway in Scheme I:

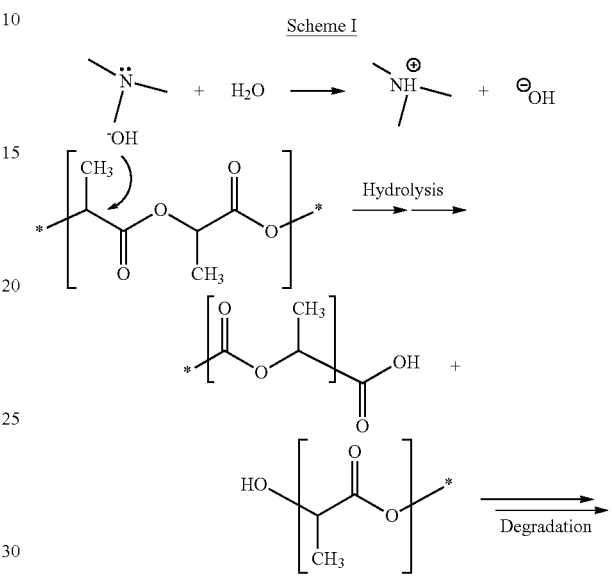

Scheme I

In the above mechanism, the DA may serve to provide a more reactive hydroxide ion nucleophile that increases the rate of polymer degradation compared to when the degradation is dependent on reaction with a neutral water molecule.

Similarly, it is believed that according to some embodiments the aminolysis of a degradable polymer in an aqueous environment may be expressed by the following exemplary pathway in Scheme II:

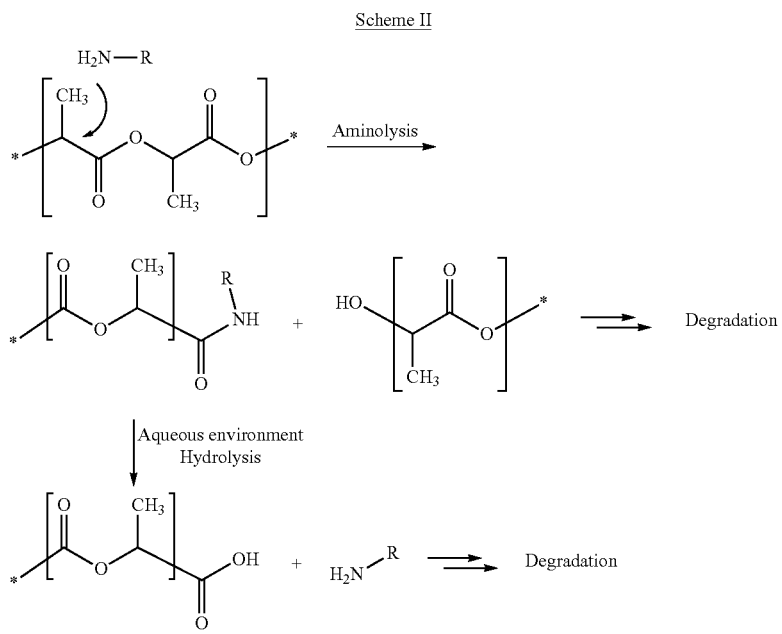

Scheme II where R may be any of the DAs that contain a primary amine group. While Scheme II only depicts the nucleophilic attack by a primary amine group, the same aminolysis pathway may occur via a nucleophilic attack by any secondary amine group of the degradation accelerators described herein.

In general, the rate of degradation of the degradable polymers suitable for use in the present disclosure may be influenced by several factors including temperature, the type of chemical bond in the polymer backbone, hydrophilicity or hydrophobicity of the degradable polymer, the molecular weight of the degradable polymer, particle size and shape, porosity, crystallinity, and the presence of low molecular weight compounds (e.g., MW lower than about 500) in the degradable polymer.

In some embodiments, it is believed that the degradation of the degradable polymer may be caused by the reaction of water (i.e., hydrolysis) with a labile —COO— bond of the degradable polymer, such as an ester or anhydride bond in a polylactide chain. The reaction rate may be closely related to the ability of the degradable polymer to absorb water. Typically, hydrophilic polymers are capable of absorbing a larger quantity of water than a hydrophobic matrix, and therefore, hydrophilic polymers usually degrade more quickly than hydrophobic matrices. In general, a degradable polymer with a greater amorphous content may be attacked more readily by the DA solutions of the present disclosure, and therefore may hydrolyze more readily than crystalline materials. Without being limited by theory, it is believed that hydrolytic polymer degradation reactions by hydrolysis with water or hydroxide ion (as shown in Scheme I), and aminolytic polymer degradation reactions by amine containing groups (as shown in Scheme II) may be taking place simultaneously at different rates of which aminolytic reactions are expected to be fastest followed by hydrolytic reactions with hydroxide ion. Hydrolytic reaction rates with neutral water are expected to be slowest. DA molecules are presumed to increase the rates of polymer degradation by providing the faster degradation pathways. Addition of inorganic bases such as alkali metal hydroxides or other pH-increasing inorganic material may increase the rates of degradation by the hydroxide ion pathway described in Scheme I, but the amine DA materials provide faster aminolytic pathways as described in Scheme II, as well as by the hydrolytic pathway described in Scheme 1 due to increased levels of hydroxide ion in the aqueous fluid in the presence of amines.

In an embodiment, the degradable polymer comprises amorphous PLA. In such embodiments, PLA is degraded by contact with an aqueous solution of propylenediamine at temperatures ranging from about 60° F. (15.6° C.) to about 120° F. (48.9° C.).

In an embodiment, the degradable polymer comprises semi-crystalline PLA. In such embodiments, PLA is swollen first by contact with an aqueous solution of triethanolamine and then degraded with another DA solution at temperatures ranging from about 120° F. (48.9° C.) to about 250° F. (121.1° C.).

In an embodiment, the degradable polymer comprises poly(glycolic acid). In such embodiments, poly(glycolic acid) is degraded by contact with an aqueous solution of propylenediamine at temperatures ranging from about 80° F. (26.7° C.) to about 150° F. (65.6° C.).

In an embodiment, the degradable polymer comprises semi-crystalline PLA with a melting point of about 140° F. (60° C.). In such embodiments, PLA is degraded by contact with an aqueous solution of propylenediamine at temperatures ranging from about 100° F. (37.8° C.) to about 200° F. (93.3° C.).

In an embodiment, the degradable polymer comprises a degradable semi-crystalline copolymer with a melting point of about 300° F. (148.9° C.) having lactic acid as one of the monomers. In such embodiments, the PLA copolymer is degraded by contact with an aqueous solution of ethanolamine at temperatures ranging from about 100° F. (37.8° C.) to about 180° F. (82.2° C.).

In an embodiment, the degradable polymer comprises a degradable semi-crystalline copolymer with a melting point of about 300° F. (148.9° C.) having lactic acid as one of the monomers. In such embodiments, the PLA copolymer is degraded by contact with an aqueous solution of triethylenetetraamine at temperatures ranging from about 140° F. (60° C.) to about 300° F. (148.9° C.).

In an embodiment, the degradable polymer comprises a physical blend of degradable semi-crystalline polymers with melting points of 140° F. (60° C.) and 240° F. (115.6° C.) and having PLA as one of the blend components. In such embodiments, the degradable polymer blend is degraded by contact with an aqueous solution of ethanolamine at temperatures ranging from about 180° F. (82.2° C.) to about 320° F. (160° C.).

In an embodiment, the degradable polymer is used in combination with a DA solution that causes initial swelling of the polymer, followed by degradation of the degradable polymer.

In an embodiment, the degradable polymer is used in the presence of more than one DA solution, of which one DA is added for the purpose of swelling the polymer, and the other DA is for the purpose of degrading the polymer. Thus in an embodiment, a method of servicing wellbore comprises introducing to the wellbore a degradable material (DM) and at least a first and a second DA of the type disclosed herein where the first and the second DA differ and where the first and second DAs may be added sequentially or simultaneously.

The DAs and/or DMs disclosed herein may be included in any suitable wellbore servicing fluid (WSF). As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids. It is to be understood that "subterranean formation" encompasses both areas below exposed earth and areas below earth covered by water such as ocean or fresh water.

The aqueous fluids that may be utilized in the WSF may be fresh water, saltwater (e.g., water containing one or more salts dissolved therein), brine (e.g., saturated saltwater), or seawater. In certain embodiments, an aqueous fluid may be present in the WSF used in the methods of the present disclosure in an amount in the range of from about 40 wt. % to about 99 wt. % based on the total weight of the WSF. In certain embodiments, an aqueous fluid may be present in the WSF used in the methods of the present disclosure in an amount in the range of from about 20 wt. % to about 80 wt. % based on the total weight of the WSF. One of ordinary skill in the art, with the benefit of this disclosure, will recognize the appropriate amount of an aqueous fluid for a chosen application.

In an embodiment, the WSF comprises a suspending agent. The suspending agent in the WSF may function to prevent the DA particulates (e.g., aziridine oligomer derivatives) from settling in the suspension during its storage or before reaching its downhole target (e.g., a portion of the wellbore and/or subterranean formation comprising degradable polymer). In an embodiment, the suspending agent in the WSF may function to prevent the fully or partially degraded DM from settling during flow back subsequent to treatment with a DA. In accordance with the methods of the present disclosure, the suspending agent may comprise microfine particulate materials, (e.g., less than about 1 micron) hereinafter referred to as colloidal materials, clays and/or viscosifying or gel forming polymers.

Nonlimiting examples of colloidal materials suitable for use in the present disclosure include carbon black, lignite, brown coal, humic acid, styrene-butadiene rubber latexes, polyvinyl alcohol latexes, acetate latexes, acrylate latexes, precipitated silica, fumed/pyrogenic silica, and viscoelastic surfactant micelles.

Nonlimiting examples of clays suitable for use in the present disclosure include bentonite, attapulgite, kalonite, meta kalonite, laponite, hectorite and sepiolite.

Nonlimiting examples of viscosifying or gel forming polymers suitable for use in the present disclosure include a copolymer of 2-acrylamido-2-methylpropane sulfonic acid and N,N-dimethylacrylamide, carragenan, scleroglucan, xanthan gum, guar gum, hydroxypropylguar, hydroxyethylcellulose, carboxymethylhydroxyethylcellulose, welan gum, succinoglycan, copolymers or terpolymers of acrylamidomethyl propane sulfonate, N,N-dimethylacrylamide, acrylic acid, and vinyl acetate.

In an embodiment, the suspending agent is present in the WSF in an amount of from about 0.01 wt. % to about 10 wt. %, alternatively from about 0.1 wt. % to about 5 wt. %, or alternatively from about 0.25 wt. % to about 1.5 wt. % based on the total weight of the WSF.

The WSF may further comprise additional additives as deemed appropriate by one of ordinary skill in the art, with the benefit of this disclosure. Additives may be used singularly or in combination. Examples of such additional additives include, but are not limited to, pH-adjusting agents, pH-buffers, oxidizing agents, enzymes, lost circulation materials, scale inhibitors, surfactants, clay stabilizers, fluid loss control additives, or combinations thereof. Nonlimiting examples of such additives are also described in U.S. Patent Publication No. 20100273685 A1, which is incorporated by reference herein in its entirety.

The DM (e.g., degradable polymer) may be introduced into a subterranean formation for any of a number of uses. In some embodiments, degradable polymers may be used in subterranean operations as fluid loss control particles, diverting agents, filter cake components, drilling fluid additives, cement additives, and the like. In certain embodiments, the degradable polymer may be in a mechanical form, such as in a downhole tool (e.g., plugs, sleeves, and the like), or as a coating on a metallic tool. In other embodiments, the degradable polymer may be present in a filter cake that is present in the subterranean formation. For example, the degradable polymer may be introduced into the formation as part of the fluid that forms the filter cake, such that the filter cake contains the degradable polymer. In some instances, the degradable polymer may be capable of releasing a desirable degradation product, e.g., an acid, during its hydrolysis. The acid released by certain degradable polymers may be used to facilitate a reduction in the viscosity of a fluid or to degrade a filter cake, as well as for numerous other functions in subterranean operations. Accordingly, the methods of the present disclosure may be used in any subterranean operation in which the degradation of a degradable polymer is desired.

In some embodiments, a degradable polymer may be introduced into a subterranean formation by including the degradable polymer in the WSF (e.g., a fracturing fluid or an acidizing fluid). Such a WSF may comprise an aqueous fluid (e.g., an aqueous carrier fluid) and a degradable polymer. Depending on the application, the WSF further may comprise one or more of the following: a suspending agent, a crosslinking agent, bridging agents, and a proppant.

A degradable polymer may be included in the WSFs in an amount sufficient for a particular application. For example, in embodiments where degradable polymers capable of releasing an acid are used, a degradable polymer may be present in the WSF in an amount sufficient to release a desired amount of acid. In some embodiments, the amount of the released acid may be sufficient to reduce the viscosity of the treatment fluid to a desired level. In another embodiment, the amount of the released acid may be sufficient to facilitate the degradation of an acid-soluble component, for example, an acid-soluble component of a filter cake, an acid-soluble component adjacent to a filter cake, or an acid-soluble component (e.g., calcium carbonate) of a proppant pack.

In certain embodiments, a degradable polymer may be present in the WSF in an amount in the range of from about 1% to about 30% by weight of the WSF. In certain embodiments, a degradable polymer may be present in the WSF in an amount in the range of from about 3% to about 10% by weight of the WSF. One of ordinary skill in the art, with the benefit of this disclosure, will be able to determine the appropriate amount of a degradable polymer to include in a treatment fluid for a particular application.

WSFs, in addition to introducing degradable polymers into a wellbore and/or subterranean formations, may also be used to introduce a DA solution into a wellbore and/or subterranean formation. For example, by placement of a WSF comprising a DA proximate to or in contact with the degradable material present in the wellbore and/or subterranean formation. Accordingly, in some embodiments, a WSF may comprise a DA solution in addition to or in lieu of a DM. Such WSFs may be used to hydrolyze degradable polymers present in the fluid or present in the wellbore and/or subterranean formation (e.g., in a filter cake, in a proppant pack, or in a downhole tool). The DA solution may be present in the WSF in an amount in the range of from about 0.1 wt. % to about 50 wt. % based on the total weight of the WSF. In some embodiments, the DA solution may be present in an amount in the range of from about 1 wt. % to about 15 wt. % based on the total weight of the WSF.

In some embodiments, the DA solution may be placed in the formation prior to the placement of the degradable material. In such cases, the DA solution may be made to contact the degradable materials by drawing down the pressure on the wellbore, for example by putting the well back on production. Alternately, the DA solution and degradable material may be pumped together along with the well treatment fluid (e.g., a fracturing fluid). Alternately, the DA solution may be placed in the wellbore to contact the degradable material already placed in the wellbore. Accordingly, the DM and DA may be placed into the wellbore in any suitable order or combination necessary to meet the objectives of a given wellbore service, for example simultaneously (including one or more DMs combined with one or more DAs in a common WSF or a first WSF comprising one or more DMs placed simultaneously with a second WSF comprising one or more DAs, such as pumping the first WSF down the flowbore of a tubular placed in a wellbore and pumping the second WSF down an annulus between the tubular and the wellbore) or sequentially (e.g., a first WSF comprising one or more DMs pumped ahead or behind a second WSF comprising one or more DAs, for example as one or more slugs of material that may stay constant or vary in sequence such as DM/DA; DA/DM; DM/DA/DM/DA; DA/DM/DA; DA/DM/DA/DM/DA; DM/$1^{st}$ DA/$2^{nd}$ DA; $1^{st}$ DA/$1^{st}$ DM/$2^{nd}$ DM/$2^{nd}$ DA; etc.).

According to some embodiments, a WSF comprising a degradable polymer may be introduced to a wellbore and/or subterranean formation simultaneously with the introduction of a DA solution that does not adversely react with or otherwise interfere with any aspect of the WSF. In other embodiments, a DA solution may be introduced to the wellbore and/or subterranean formation subsequent to the introduction of the degradable polymer. In some embodiments, a degradable polymer, which may be provided in any of a number of forms, e.g., in a filter cake, may be contacted with a DA solution subsequent to the introduction of the degradable polymer into the wellbore and/or subterranean formation.

For example, in certain embodiments, the present disclosure provides a method of treating at least a portion of a wellbore and/or subterranean formation comprising providing a WSF that comprises an aqueous fluid, a degradable polymer capable of releasing an acid, and a DA solution and introducing the WSF into the wellbore and/or subterranean formation. At a chosen time or after a desired delay period, the DA solution hydrolyzes the degradable polymer so as to release an acid that facilitates a reduction in the WSF's viscosity.

In some embodiments, a degradable polymer may be provided in a wellbore and/or subterranean formation by a fluid (e.g., a drill-in and servicing fluid) capable of forming a filter cake on the face of a portion of a wellbore and/or subterranean formation. Such fluids are used, among other things, to minimize damage to the permeability of the subterranean formation. Before desirable fluids, such as hydrocarbons, may be produced, the filter cake should be removed.

Accordingly, in certain embodiments of the present disclosure, a DA solution may be introduced into a wellbore and/or subterranean formation to facilitate the removal of a filter cake that comprises a degradable polymer. When introduced into the wellbore and/or subterranean formation, the DA solution degrades the degradable polymer.

In an embodiment, a DA of the type disclosed herein may be used in conjunction with stimulation techniques designed to increase the complexity of fractures by first plugging the pores in existing fractures and then diverting the fracturing fluid to initiate other fractures. ACCESSFRAC service is an example of such a stimulation service commercially available from Halliburton Energy Services, Inc. In such embodiments, the pores may be plugged with a diverter material such as the ones described in the present disclosure. BIO-VERT NWB diverting system is an example of a temporary polyester-based diverting agent commercially available from Halliburton Energy Services, Inc. In such applications the degradable polymers may comprise a multimodal particle size distribution, for example, bimodal or trimodal particle size distributions. In such an embodiment, the degradable polymer comprising multimodal polymer particle size distribution may contain particles with sizes ranging from about 5 mm to about 20 microns, alternatively from about 3 mm to about 50 microns, or alternatively from about 1 mm to about 100 microns.

To improve efficiency of the diverting process, the particles after placement may be treated with a swelling DA solution which will swell the degradable polymer particles forming a continuous mass of diverting plug before the degradation process sets in. The DA solution may be advantageously used for removing the diverter plugs under wellbore conditions where the BHT is less than about 320° F. (160° C.), alternatively less than about 140° F. (60° C.), or alternatively less than about 100° F. (37.8° C.). By properly selecting the diverting polymer sizes and choosing a suitable DA of the type disclosed herein, the wait time for putting the well on production may be advantageously shortened to less than about 1 week, alternatively less than about 3 days.

In an embodiment, the DA of the type disclosed herein may be used in conjunction with stimulation techniques which are designed to create highly conductive fractures. PILLAR FRAC stimulation technique is an example of such a technique and is commercially available from Halliburton Energy Services, Inc. In an embodiment, the degradable polymer may be advantageously soaked and/or immersed in a DA solution and then pumped downhole, thereby removing the need to place the DA solution separately. In such embodiments the degradable polymer may be soaked in a DA solution for a time period of from about 6 hours to about 72 hours, alternatively from about 12 hours, to about 48 hours or alternatively from about 16 hours, to about 24 hours. While the degradable polymer may function as a diverter downhole, the DA solution will concurrently degrade the polymer in an advantageously shorter time frame of less than about 1 week, alternatively less than about 3 days. In such an embodiment, the degradable polymer (e.g., PLA) may be used at a BHT of less than about 140° F. (60° C.).

In an embodiment, the degradable polymer may be used for assembling a degradable filter cake with drill-in fluids. In such an embodiment, the degradable polymer comprises multimodal polymer particles with sizes ranging from about 1 mm to about 20 microns, alternatively from about 0.5 mm to about 50 microns, or alternatively from about 500 microns to about 100 microns. The filter cake may perform its intended function and it may be subsequently advantageously removed with a DA solution of the type disclosed herein having a pH of less than about 11, alternatively less than about 10, or alternatively less than about 9.

The following are additional enumerated embodiments of the concepts disclosed herein.

A first embodiment which is a method of servicing a wellbore comprising providing a degradable polymer within a portion of a wellbore, a subterranean formation or both; preparing a wellbore servicing fluid comprising a degradation accelerator wherein the degradation accelerator comprises an alkanolamine, an oligomer of aziridine, a polymer of azridine, a diamine, or combinations thereof; and placing the wellbore servicing fluid comprising a degradation accelerator into the wellbore, the subterranean formation or both wherein the degradation accelerator contacts the degradable polymer.

A second embodiment which is the method of the first embodiment wherein the alkanolamine comprises ethanolamine, triethanolamine, monoethanolamine, diethanolamine, diglycolamine, di-2-propanolamine, N-methyldiethanolamine, 2-amino-2-methyl-1-propanol, 2-piperidineethanol, aminopropane diol, or combinations thereof.

A third embodiment which is the method of any of the first and second embodiments wherein the alkanolamine comprises a compound characterized by Formula I:

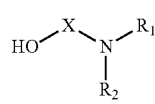

Formula I where $R_1$ and $R_2$ may each independently be hydrogen, an unsubstituted alkyl chain comprising from about 1 to about 6 carbon atoms, or a substituted alkyl chain comprising from about 3 to about 6 carbon atoms and X comprises a substituted or unsubstituted alkylene having from about 1 to about 4 carbon atoms.

A fourth embodiment which is the method of any of the first through third embodiments wherein the oligomer of aziridine comprises a linear aziridine oligomer, a branched aziridine oligomer, any derivatives thereof, or any combinations thereof.

A fifth embodiment which is the method of any of the first through fourth embodiments wherein the number of repeating units in the oligomer is less than about 100.

A sixth embodiment which is the method of any of the first through fifth embodiments wherein the oligomer of aziridine comprises a compound characterized by Formula II:

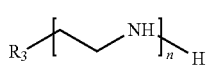

Formula II where n may range from about 2 to about 100 and $R_3$ comprises a primary amine.

A seventh embodiment which is the method of any of the first through sixth embodiments wherein the oligomer of aziridine comprises a compound characterized by Formula III:

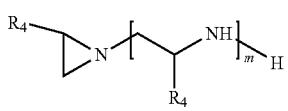

Formula III where m ranges from about 2 to about 100 and $R_4$ comprises a methyl group.

An eighth embodiment which is the method of any of the first through seventh embodiments wherein the oligomer of aziridine comprises a compound characterized by Formula IV:

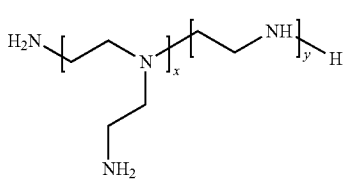

Formula IV where the repeating units occur in a total amount of about (x+y) wherein the total value of (x+y) ranges from about 2 to about 50.

A ninth embodiment which is the method of any of the first through eighth embodiments wherein the oligomer of aziridine comprises diethylene triamine, triethylenetetraamine, and tetraethylenepentamine, or combinations thereof.

A tenth embodiment which is the method of any of the first through ninth embodiments wherein the polymer of aziridne comprises greater than about 100 repeating units.

An eleventh embodiment which is the method of any of the first through tenth embodiments wherein the diamine comprises a compound characterized by general Formula V:

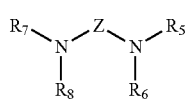

Formula V where $R_5$, $R_6$, $R_7$, and $R_8$ may each independently be hydrogen, an unsubstituted alkyl chain having from about 1 to about 3 carbon atoms, or a substituted alkyl chain having from about 2 to about 4 carbon atoms and Z comprises a substituted or unsubstituted alkylene chain having from about 2 to about 6 carbon atoms.

A twelfth embodiment which is the method of the eleventh embodiment wherein when Z comprises an unsubstituted ethylene group at least one of $R_5$, $R_6$, $R_7$, or $R_8$ is not a hydrogen.

A thirteenth embodiment which is the method of any of the first through twelfth embodiments wherein the degradation accelerator solution is an aqueous solution with a pH of less than about 11.

A fourteenth embodiment which is the method of any of the first through thirteenth embodiments wherein the degradable polymer comprises an aliphatic polyester, a poly(lactide), a poly(glycolide), a poly(ε-caprolactone), a poly(hydroxy ester ether), a poly(hydroxybutyrate), a poly(anhydride), a polycarbonate, a polyether ester, a polyester amide, a copolymer thereof, or any combinations thereof.

A fifteenth embodiment which is the method of any of the first through fourteenth embodiments wherein the degradable polymer comprises a copolymer of lactic and gycolic acid.

A sixteenth embodiment which is the method of any of the first through fifteenth embodiments wherein the degradable polymer further comprises a plasticizer.

A seventeenth embodiment which is the method of the sixteenth embodiment wherein the plasticizer comprises a polyethylene glycol (PEG); a polyethylene oxide; an oligomeric lactic acid; a citrate ester; a glucose monoester; a partially hydrolyzed fatty acid ester; a PEG monolaurate; a triacetin; a poly(ε-caprolactone); a poly(hydroxybutyrate); a glycerin- 1 -benzoate- 2,3 -dilaurate; a glycerin- 2 -benzoate- 1,3 -dilaurate; a bis(butyl diethylene glycol)adipate; an ethylphthalylethyl glycolate; a glycerin diacetate monocaprylate; a diacetyl monoacyl glycerol; a polypropylene glycol; an epoxy derivative of a polypropylene glycol; a poly(propylene glycol)dibenzoate; a dipropylene glycol dibenzoate; a glycerol; an ethyl phthalyl ethyl glycolate; a poly(ethylene adipate)distearate; a di-iso-butyl adipate, or combinations thereof.

An eighteenth embodiment which is the method of any of the first through seventeenth embodiments wherein the wellbore servicing fluid comprises a suspending agent.

A nineteenth embodiment which is the method of the eighteenth embodiment wherein the suspending agent comprises colloidal materials, clays, gel forming polymers, or combinations thereof.

A twentieth embodiment which is the method of any of the first through nineteenth embodiments wherein the degradation accelerator is present in the wellbore servicing fluid in an amount of from about 0.1 wt. % to about 50 wt. % based on the total weight of the wellbore servicing fluid.

A twenty-first embodiment which is a method of servicing a wellbore penetrating a subterranean formation comprising placing a fracturing fluid comprising a degradable polymer into the subterranean formation via the wellbore wherein the degradable polymer comprises an aliphatic polyester, a poly(lactide), a poly(glycolide), a poly(ε-caprolactone), a poly(hydroxy ester ether), a poly(hydroxybutyrate), a poly(anhydride), a polycarbonate, a polyether ester, a polyester amide, or combinations thereof; and contacting the degradable polymer with the degradation accelerator, wherein the degradation accelerator comprises an alkanolamine, an oligomer of aziridine, a polymer of aziridine, a diamine, or combinations thereof.

A twenty-second embodiment which is the method of the twenty-first embodiment wherein the degradable polymer is immersed in the degradation accelerator prior to placement in the wellbore.

A twenty-third embodiment which is the method of any of the twenty-first and twenty-second embodiments wherein the degradable polymer is present in a downhole tool.

A twenty-fourth embodiment which is a method of any of the twenty-first through twenty-second embodiments wherein the degradable polymer is present in a fracturing fluid.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Five commercial samples of degradable polymers polyesters comprising —COO— bond in the polymer back bone were obtained. Except for two, all polymers contained lactic acid as one of the monomers. Based on nuclear magnetic resonance spectroscopy it was established that, except for two samples, all samples contained exclusively poly(lactic acid). One polymer sample contained an additional monomer. One sample was polyglycolic acid. The crystallinity of the polylactic acid containing samples was measured by Differential Scanning Calorimeter (DSC) by heating the sample from room temperature to 392° F. (200° C.), holding the sample at 392° F. (200° C.) for 30 minutes, cooling it to room temperature and reheating to 392° F. (200° C.) at a rate of 10° C./minute. Glass transition temperatures ($T_g$), melting temperatures ($T_m$) and crystallization temperatures ($T_c$) observed during the second cycle are reported in Table 1. Polyglycolic acid (Sample 5) was not characterized by DSC. A sample for which the area of the melting peak increased substantially during the second heating cycle is deemed to be originally a low crystallinity material. All others are referred to as amorphous or semi-crystalline materials.

TABLE 1

| Sample | $T_g$ | $T_m$ | $T_c$ | Comments |
|---|---|---|---|---|
| 1-(PLA) | Not observable | 140° F. (60° C.) | 120° F. (48.9° C.) | Low crystallinity |
| 2-(PLA) | 76° F. (24.4° C.) | Not observable | Not observable | amorphous |
| 3-(PLA) | Not observable | 312° F.(155.6° C.) | 210° F.(98.9° C.) | Semi-crystalline |
| 4-(PLA + a polyester) | Not observable | 125° F. (51.7° C.) and 235° F. (112.8° C.) | 90° F. (32.2° C.) and 165° F. (73.9° C.) | Melt blend of two semi-crystalline polymers |

The degradation tests were performed by first grinding the materials and sieving them. The particles that went through a 20 mesh sieve were collected and used in the degradation studies. A solid sample of 1 gram of the degradable polymer was placed in 100 ml tap water and about a stoichiometric amount of DA was added. The stoichiometric amounts of the DA solution required were calculated by dividing the weight of degradable polymer sample by the molecular weight of monomer (lactic acid in the case of PLA based polymer and glycolic acid in the case of polyglycolic acid) to obtain moles of —COO— bonds present in the polymer, and calculating the weight of degrading agent containing equivalent moles of nitrogen atoms. The mixtures were kept in a water bath heated to 140° F. (60° C.). Comparative samples using water and ethylenediamine as the degrading agents were also investigated. The amines tested included triethylenetetramine (TETA) as a representative aziridine oligomer (Formula II, n=3), and polyethyleneimine (PEI) as polymerized aziridine (Formula IV, n=>>100). PEI is commercially available from Halliburton Energy Services as HZ-20 crosslinker. Ethylenediamine (EDA) also served as representative example of higher homologues of ethylenediamine (Formula V, Z=3-6, and R5, R6, R7 and R8 are hydrogens). Alkanolamines used in the study included ethanolamine (EA), triethanolamine (TEA) and triisopropanolamine (Formula I). The progress of the polymer degradation was measured by determining the remaining weight of degradable polymer at periodic intervals by filtering the polymer mixture, drying the undissolved solid, and measuring its weight. The results for samples utilizing an aziridine oligomer, aziridine polymer and diamine as the DA are presented in Tables 2 and 3. Table 2 presents the results from measuring remaining polymer weights at 140° F. (60° C.) after 3, 6 and 9 days. Table 3 provides results for % polymer degradation of semicrystalline PLA and semicrystalline polymer blends Samples 3 and 4 respectively after 25 days at 140° F. (60° C.).

TABLE 2

| Degradable Polymer | Amine compound | Remaining weight (g)/3 days | Remaining weight (g)/6 days | Remaining weight (g)/9 days |
|---|---|---|---|---|
| Sample 1 (Low crystallinity PLA) | None | 1.41 | 1.26 | 1.17 |
| | TETA | 1.24 | 0.95 | 0.65 |
| | EDA | 0.71 | 0.36 | 0.26 |
| | PEI | 2.03 | 1.72 | 0.97 |
| Sample 2 (amorphous PLA) | None | 0.79 | 0.27 | 0.14 |
| | TETA | 0.95 | NA | 0.13 |
| | EDA | 0.05 | 0.12 | 0.11 |
| | PEI | 0.70 | Not measured | 0.25 |
| Sample 3 (semi-crystalline PLA) | None | 1.13 | 1.19 | 1.21 |
| | TETA | 0.83 | 0.73 | 0.59 |
| | EDA | 0.62 | 0.29 | 0.20 |

TABLE 2-continued

| Degradable Polymer | Amine compound | Remaining weight (g)/3 days | Remaining weight (g)/6 days | Remaining weight (g)/9 days |
|---|---|---|---|---|
| | PEI | 1.22 | Not measured | 1.29 |
| Sample 4 | None | 1.73 | 1.24 | Not measured |
| | TETA | 1.22 | 1.21 | 1.53 |
| | EDA | 1.28 | 1.27 | 1.22 |
| | PEI | 1.89 | 1.19 | 1.12 |
| Sample 5 (Semi-crystalline PGA) | None | 1.11 | 1.15 | 0.97 |
| | TETA | 0.68 | 0.43 | 0.40 |
| | EDA | 0.31 | 0.13 | 0.11 |
| | PEI | 1.19 | 1.39 | 1.04 |

The results in Table 2 demonstrate that, semi crystalline polymers have a tendency to increase in weight when placed in water, whereas such behavior was not observed for the amorphous polymer. The increased weight in water for the semicrystalline polymer persisted even after 9 days, indicating no polymer degradation. The amorphous polymer degraded significantly in water over 6 days. All DA solutions degraded the amorphous polymer rapidly with the diamines providing the fastest degradation rates (<4 days). Among the semicrystalline polymers, the weight increase was highest and polymer degradation lowest when using DA solutions comprising an aziridine polymer indicating that the aziridine polymers (i.e., Formula IV, n=>>100) may be more suitable as polymer swelling agents. In general, increases in polymer weight were accompanied by swelling of the polymer particles. Therefore, polymers of aziridine may be more suitable for swellable degradable semicrystalline polymers for improved fluid diversion efficiency, fluid loss control and filter cake fluid loss control efficiency. Swollen particles contain minimized interparticle porosity; encourage particle fusion forming a continuous layer of filter cake, or a single fused mass of plug blocking flow of fluid more effectively. Ethylene diamine containing only primary amine groups was more effective as a degradation accelerator than the azidirine oligomer, TETA, which contained the same number of primary amine groups but also contained two secondary amine groups. None of the DAs were effective in accelerating degradation of the most crystalline polymer blend (Sample 4) and they all increased the degradable polymer weight due to swelling even after 9 days.

TABLE 3

| Degradation Accelerator | % Degradation for Sample 3 | % Degradation for Sample 4 |
|---|---|---|
| None | 1 | 13 |
| TETA | 64 | 20 |
| EDA | 93 | 9 |
| PEI | 2 | 0 |

The results after 25 days testing at 140° F. (60° C.) shown in Table 3 indicate that of the two polymers which were most resistant to degradation namely Samples 3 and 4, the former showed the most accelerated degradation in the presence of aziridine oligomer, TETA, and the diamine, EDA compared to when only water was present, whereas the latter polymer showed reasonably accelerated degradation rates with aziridine oligomer. The polymeric aziridine was not effective in degrading the polymer even after such a long duration.

The results for alkanolamine-accelerated polymer degradation in 4 days at 140° F. (60° C.) are shown in Table 4.

TABLE 4

| Degradable Polymer | Alkanolamine | % Degradation in 4 days @ 140° F. (60° C.) |
|---|---|---|
| Sample 1 (Low crystallinity PLA) | Control | 0 |
| | EA | 19 |
| | TEA | 0 |
| Sample 2 (amorphous PLA) | Control | 20 |
| | EA | 100 |
| | TEA | 100 |
| Sample 3 (semi-crystalline PLA) | Control | 5 |
| | EA | 57 |
| | TEA | 8 |
| Sample 4 | Control | 2 |
| | EA | 35 |
| | TEA | 6 |

The 4-day results shown in Table 4, and their comparison with the 3 or 6-day results shown for the DAs in Table 2 demonstrate that ethanolamine is an effective polymer degradation accelerator for all polymers irrespective of the polymer crystallinity. The results also indicate that for semi-crystalline polymers, ethanolamine is a more effective DA than the amines.

Example 2

The effectiveness of DAs of the type disclosed herein on polymer swelling was studied by measuring swollen polymer weights in the presence of DA materials. Results in Table 2 indicated that semi-crystalline polymers swell in the presence of water itself. However, initial swelling rates for semi-crystalline polymers are higher when using polyethyleneimine than water. Swelling was not observed for the amorphous polymer with water or amine-based DA solutions. Amorphous polymer (Sample 2) swelled in the presence of trialkanolamines, namely triethanolamine and triisopropanolamine, significantly more than in water as shown in FIG. 1. In this example, five beads (shown in FIG. 1) of Sample 2 polymer were separately placed in 100 ml of water, a solution of triethanolamine (TEA) and a solution of triisopropanolamine and the samples were kept in a water at 140° F. (60° C.) for two days. The results shown in FIG. 1 for aminoalcohols combined with the results presented in Table 4 indicate that the swelling step by the DAs may be preceding the degradation step or both processes may be taking place simultaneously. In the latter case, the swelling process may be a kinetically-controlled process whereas the degradation may be thermodynamically controlled. The polymer swelling by aminoalcohol- and amine-based DA solutions initially before the degradation rates accelerate allow for improving the performance of the polymers by forming a continuous mass of solid degradable polymer which can increase the fluid loss, plugging and diversion efficiency of the degradable polymers.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore wherein a degradable polymer resides within a portion of the wellbore, the method comprising:
    preparing a wellbore servicing fluid comprising a degradation accelerator wherein the degradation accelerator comprises an oligomer of aziridine, a polymer of aziridine; and
    placing the wellbore servicing fluid into the wellbore, the subterranean formation or both wherein the degradation accelerator contacts the degradable polymer residing within the portion of the wellbore and at least partially accelerates the degradation of the degradable polymer.

2. The method of claim 1 wherein the oligomer of aziridine comprises a linear aziridine oligomer, a branched aziridine oligomer, any derivatives thereof, or any combinations thereof.

3. The method of claim 1 wherein the number of repeating units in the oligomer of aziridine is less than about 100.

4. The method of claim 1 wherein the oligomer of aziridine comprises a compound characterized by Formula II:

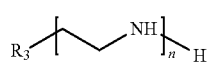

Formula II where n may range from about 2 to about 100 and $R_3$ comprises a primary amine.

5. The method of claim 1 wherein the oligomer of aziridine comprises a compound characterized by Formula III:

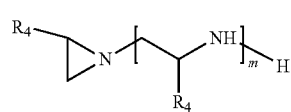

Formula III where m ranges from about 2 to about 100 and $R_4$ comprises a methyl group.

6. The method of claim 1 wherein the oligomer of aziridine comprises a compound characterized by Formula IV:

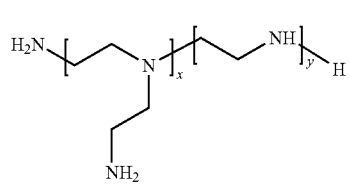

Formula IV where the repeating units occur in a total amount of about (x+y) wherein the total value of (x+y) ranges from about 2 to about 50.

7. The method of claim 1 wherein the oligomer of aziridine comprises diethylene triamine, triethylenetetraamine, and tetraethylenepentamine, or combinations thereof.

8. The method of claim 1 wherein the polymer of aziridine comprises greater than about 100 repeating units.

9. The method of claim 1 wherein the degradation accelerator solution is an aqueous solution with a pH of less than about 11.

10. The method of claim 1 wherein the degradable polymer comprises an aliphatic polyester, a poly(lactide), a poly(glycolide), a poly(ε-caprolactone), a poly(hydroxy ester ether), a poly(hydroxybutyrate), a poly(anhydride), a polycarbonate, a polyether ester, a polyester amide, a copolymer thereof, or any combinations thereof.

11. The method of claim 1 wherein the degradable polymer comprises a copolymer of lactic and glycolic acid.

12. The method of claim 1 wherein the degradable polymer further comprises a plasticizer.

13. The method of claim 12 wherein the plasticizer comprises a compound selected from the group consisting of: a polyethylene glycol (PEG); a polyethylene oxide; an oligomeric lactic acid; a citrate ester; a glucose monoester; a partially hydrolyzed fatty acid ester; a PEG monolaurate; a triacetin; a poly(ε-caprolactone); a poly(hydroxybutyrate); a glycerin-1-benzoate-2,3-dilaurate; a glycerin-2-benzoate-1,3-dilaurate; a bis(butyl diethylene glycol)adipate; an ethylphthalylethyl glycolate; a glycerin diacetate monocaprylate; a diacetyl monoacyl glycerol; a polypropylene glycol; an epoxy derivative of a polypropylene glycol; a poly(propylene glycol)dibenzoate; a dipropylene glycol dibenzoate; a glycerol; an ethyl phthalyl ethyl glycolate; a poly(ethylene adipate)distearate; a di-iso-butyl adipate, and any combination thereof.

14. The method of claim 1 wherein the wellbore servicing fluid comprises a suspending agent.

15. The method of claim 14 wherein the suspending agent comprises colloidal materials, clays, gel forming polymers, or combinations thereof.

16. The method of claim 1 wherein the degradation accelerator is present in the wellbore servicing fluid in an amount of from about 0.1 wt.% to about 50 wt.% based on the total weight of the wellbore servicing fluid.

17. A method of servicing a wellbore penetrating a subterranean formation comprising:
   placing a fracturing fluid comprising a degradable polymer into the subterranean formation via the wellbore wherein the degradable polymer comprises a polymer selected from the group consisting of: an aliphatic polyester, a poly(lactide), a poly(glycolide), a poly(e-caprolactone), a poly(hydroxy ester ether), a poly(hydroxybutyrate), a poly(anhydride), a polycarbonate, a polyether ester, a polyester amide, and any combination thereof;
   introducing a wellbore servicing fluid comprising a degradation accelerator into the subterranean formation via the wellbore, wherein the degradation accelerator comprises an oligomer of aziridine, a polymer of aziridine; and
   contacting the degradable polymer with the wellbore servicing fluid.

18. The method of claim 17 wherein the degradable polymer is immersed in the degradation accelerator prior to placement in the wellbore.

19. The method of claim 17 wherein the degradable polymer is present in a downhole tool.

20. The method of claim 17 wherein the degradable polymer is present in a fracturing fluid.

21. A method of servicing a wellbore comprising:
   providing a degradable polymer within a portion of a wellbore, a subterranean formation or both;
   preparing a wellbone servicing fluid comprising a degradation accelerator wherein the degradation accelerator comprises an oligomer of arziridine, a polymer of aziridine,
   wherein the wellbore servicing fluid does not comprise a viscoelastic surfactant; and
   placing the wellbore servicing fluid into the wellbore, the subterranean formation or both wherein the degradation accelerator contacts the degradation polymer.

* * * * *